March 8, 1960 W. C. VIRBILA 2,927,835
RECORDING APPARATUS RECORD SHEET RECEIVING AND REMOVING MEANS
Filed Nov. 15, 1954 2 Sheets-Sheet 1

March 8, 1960 W. C. VIRBILA 2,927,835
RECORDING APPARATUS RECORD SHEET RECEIVING AND REMOVING MEANS
Filed Nov. 15, 1954 2 Sheets-Sheet 2

United States Patent Office

2,927,835
Patented Mar. 8, 1960

2,927,835

RECORDING APPARATUS RECORD SHEET RECEIVING AND REMOVING MEANS

William C. Virbila, Watertown, Conn., assignor to The Bristol Company, Waterbury, Conn., a corporation of Connecticut Application November 15, 1954, Serial No. 468,977

11 Claims. (Cl. 346—24)

This invention relates to recording instruments, and more especially to that form of instrument commonly known as the "strip type," wherein a pen or stylus borne by a movable arm deflecting with changes in a measured magnitude provides a more or less continuous graph on the surface of a clock-driven paper chart drawn from a supply roll of indeterminate length. While many strip-type recorders in which the chart is moved vertically in a downward direction have provision for allowing the paper to hang freely below the case, a large proportion of these, as well as practically all those in which the chart moves horizontally, are equipped with receiving rolls, to which the free end of the chart is attached, and upon which the record-bearing paper is accumulated under a moderate tension.

In the great majority of installations of recording instruments, with the possible exception of those located in isolated or unattended substations, it is desirable that the paper chart be removed from the instrument for inspection and filing; and this may be done weekly, or daily, or at other intervals, as circumstances may dictate. The periodic removal of the chart requires transverse cutting or tearing of the paper sheet, detachment of the accumulated record, and reattachment of the end of the paper to the receiving roll. While this is not a highly specialized task, it requires a certain technique in order to avoid a ragged end to the chart, and to make sure that the paper will be smoothly and evenly distributed on the receiving roll. Furthermore, especially where extensive installations of recording instruments are involved, the time element represented in the periodic changing of charts may become considerable, making it desirable that this operation be effected as expeditiously as possible.

It is an object of the present invention to provide means whereby the accumulated record in a strip-type instrument may readily be severed from that portion of the chart remaining in engagement with the drive mechanism and in cooperative relationship with the recording pen or stylus.

It is a further object to provide means of the above nature which shall form a permanent part of the instrument, and may readily be moved into, or retracted from, its active position.

It is a further object to provide a receiving roll from which the accumulated record may readily be removed, and to which the extremity of the severed chart may readily be reattached.

It is a further object to provide a device of the above nature which shall facilitate smooth distribution of the accumulated chart on the receiving roll.

In carrying out the purposes of the invention, there is provided in a recording instrument of the conventional strip type a guide member located behind the chart and movable at will to a position where it forms a firm support for the chart and provides a guide to facilitate severing the paper with a knife blade or equivalent sharp instrument. There is also provided a receiving roll including a clamping member adapted for longitudinal translation axially of said roll and adapted in one extreme position to receive the extremity of the chart paper, and in the other of its extreme positions to clamp said paper against the body of the roll and at the same time to present no obstruction to smooth wrapping of the paper strip about the cylindrical surface of the roll.

As a form of instrument to which the invention is especially adaptable, and as an example of its application to a utilitarian purpose, there has been selected a recorder of the so-called "miniature" class, and of the form fully set forth and described in my co-pending application Serial No. 401,634, filed December 31, 1953, issued as U.S. Patent No. 2,852,197. In that instrument a strip chart provided with perforations near one edge is carried by a supply roll mounted on a vertical axis, and passes around the cylindrically curved extremity of a platen having a flat vertical face, where it is engaged by the recording pen. Subsequently the paper strip passes beyond the extremity of the platen and about a clock-actuated driving drum provided with spaced pins to engage the perforations at the edge of the paper, and thus secure proper timing of the chart. After leaving the driving drum, the paper is wound upon a receiving roll, generally operated through a yieldable friction train from the driving drum, so as to maintain a slight tension on the strip. While it is not the intention so to restrict the present invention, its primary application is to improved means for attaching the paper chart to the receiving roll and for removing said chart therefrom as required.

Further objects and advantages of this invention will be apparent from the following description and the accompanying drawings in which.

Figure 8:
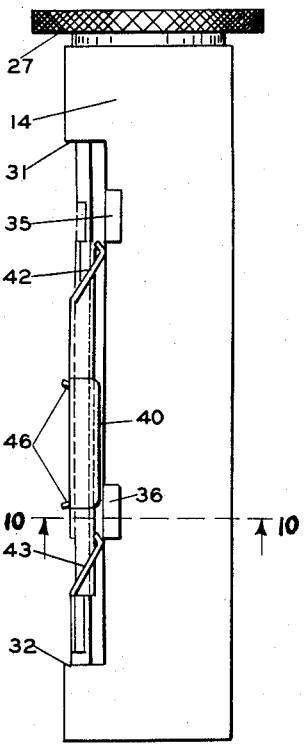
Figures 8 and 9 are side elevations of said receiving roll with component parts in two characteristic operating positions.
Figure 9:
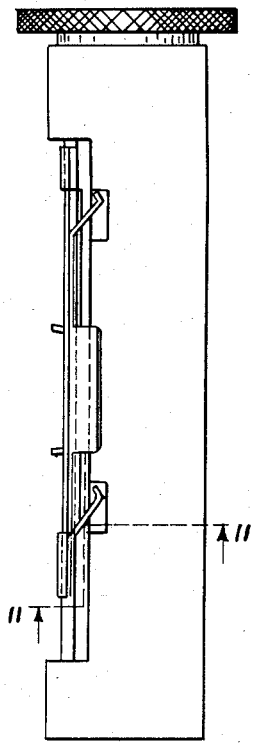
Figure 7:
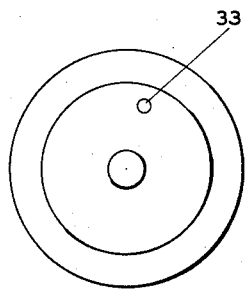
Figure 7 is an end elevation of the same.
Figure 10:
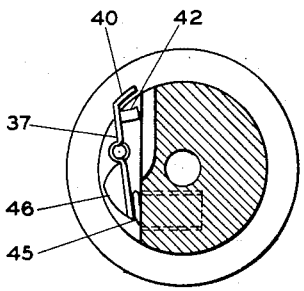
Figure 11:
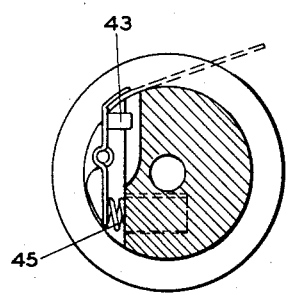

Figures 10 and 11 are each sectional views taken respectively through the lines 10—10 of Figure 8 and 11—11 of Figure 9.

Figure 1:
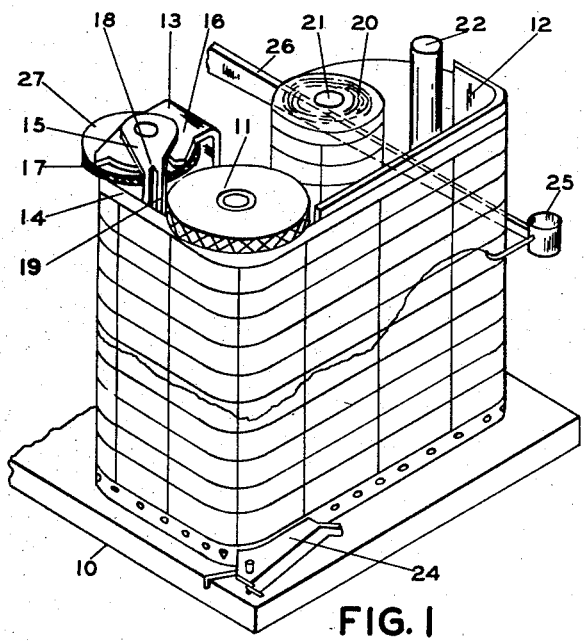
Figure 1 is an isometric view of the chart mechanism of a recording instrument in which the chart progresses in a horizontal sense.

Referring now to the drawings:

Figure 1 shows the components of the assembly comprising the invention, all mounted upon a common supporting base 10. A cylindrical driving drum or feed-roll 11, carried on a vertical axis, is adapted to be driven at a constant speed in a clockwise sense as seen in the drawings by means of a timing motor not shown in the drawings. Vertically mounted upon the base 10 is a flat platen 12 having one edge juxtaposed to, and substantially tangential to, the surface of the drum 11 and the remote edge curved cylindrically to provide a smooth engagement with a strip of paper comprising a chart as hereinafter to be described. Rotatably mounted on a vertical axis juxtaposed to that of the drum 11, and preferably supported at its upper extremity by a bracket member 13, is a receiving roll 14 adapted to be rotated by the same timing motor as the drum 11 through a friction drive or equivalent yielding means not shown in the drawing. Frictionally mounted on the bracket member 13 and adapted for limited manual rotation about the axis of the roll 14 is a guide member 15 comprising a bar portion 19 extending substantially parallel to said axis for the whole length of the roll 14, and hence for the whole width of a strip of paper to be wound thereon. Projections 16 and 17, forming parts of the bracket 13, provide limiting stops, whereby at one extremity of its travel the guide member 15 will lie behind, and at the other extremity of its travel, in front of, the plane common to the cylindrical surfaces of the driving drum 11 and the receiving roll 14 which plane represents the position of the chart paper under normal operating conditions. The bar portion 19 of the guide member 15 is preferably formed with a straight V-shaped groove 18 extending its whole length, and the purpose of which will presently be explained.

Under operating conditions a roll of paper 20 having suitable perforations near at least one edge is mounted on a vertical spindle 21 fixed behind the platen 12, and the strip of paper as unrolled therefrom passes about a vertical guide post 22 fixed to the base 10, around the curved extremity of the platen, across its face to the driving drum 11, where its perforations are engaged by the spaced teeth of the latter. Positive engagement of the chart paper with the drum 11 is assured by a releasable spring-urged finger 24 pivotally mounted on the base 10. A recording pen 25, adapted to inscribe a graph on the surface of the paper, is carried on the extremity of an arm 26 passing to the rear of the curved end of the platen 12 and operatively connected to measuring mechanism not appearing in the drawings.

For an explanation of the construction of the receiving roll 14, reference may be had to Figures 6 to 11, inclusive, which illustrate this element in various aspects. The roll 14, which is of a generally cylindrical conformation, and of an axial length corresponding to the width of the paper strip with which it is to be used, is provided with an enlarged knurled head portion 27 whereby it may be manually rotated with ease. A portion of the roll intermediate its extremities, and comprising about ⅘ of its length, is flattened to provide a plane surface 30 parallel to the axis of said roll and leaving toward the extremities thereof terminal abutment portions 31 and 32 having the original section of the roll. Between said abutment portions is extended a slender rod or shaft 33, formed, for example, of stiff, straight, steel wire.

Milled, or otherwise formed, in the plane surface 30 and spaced toward the ends thereof are two flat-bottomed grooves or troughs 35 and 36, extending transversely part way across said surface from one side thereof, and providing limited flat surfaces substantially depressed below the principal plane surface 30.

Mounted on the rod 33 for limited displacement in both a linear and an angular sense between the abutments 31 and 32 is a clamping member 38 formed preferably of stiff thin sheet metal. Said member comprises a substantially rectangular central body portion 39 having oppositely extended lateral projections 40 and 41, and inclined tongue portions 42 and 43 on one edge, all of which portions will now be described.

The body portion 39 extends along, and embraces, the rod 33, and on its median line are formed alternately raised and depressed portions to provide a channel whereby said rod is encircled by the metal of the clamping member, permitting relative displacement of the same in both an angular and a translatory sense. Said body portion is made shorter than the space between the abutments 31 and 32, thus establishing and limiting its translation along the rod 31. The projection 40 is bent toward the body of the roll 14 and is of sufficient extent to overlap the curved surface thereof a short distance. This portion is preferably given a cylindrical curvature corresponding to that of the roll, whereby, when forced toward engagement with the same, to be adapted to form a clip and exert a clamping action upon the chart paper inserted therebetween, as indicated in Figure 11. Positioned within a recess formed in the body of the roll beneath the projection 41 is a compression spring 45 acting upon the under face of the same and tending to rotate the member 38 in a clockwise sense as seen in Figures 10 and 11, whereby to develop said clamping action between the clip 40 and the surface of the roll 14. The projection 41 is provided with upturned ears 46, adapted to be grasped by the operator's fingers, facilitating shifting of the member 38 with respect to the roll 14. These ears are so conformed that they lie at all times within the circle corresponding to the periphery of the drum 14.

The inclined tongue portions 42 and 43 are spaced similarly to the grooves 35 and 36, whereby to enter and lie within the same when the member 38 is positioned at one extreme of its travel, thus permitting the projecting portion 40 to engage the convex surface of the roll. As the member 38 is moved to the opposite extreme of its travel, said tongues engage the corresponding edges of the respective grooves 35, 36 exerting a cam action, raising that side of the member 38 including the projection 40 away from the flattened portion of the roll, and by their engagement with said surface, maintaining the member in that rotated position.

In considering the manner of operation of the apparatus embodying the invention, attention may be directed first to Figures 4, 6, 8 and 10 of the drawings, wherein are shown the interrelated parts of the apparatus in the positions they occupy as the paper chart is about to be attached to the receiving roll 14. The clamping member 38 on said roll is moved to its extreme position—the bottom when the roll is vertically disposed as in the present example—and the tongues 42 and 43, resting upon the flat surface 30, cause the member 38 to be angularly positioned about the axis of rod 33 and in opposition to the influence of the spring 45, so that the clip 40 is raised from the surface of the roll, leaving a space in which may be inserted the squared end of the chart paper. The guide member 15 is positioned in contact with the stop 16, thus lying behind the plane of the paper and out of its normal path of travel.

Figures 3, 4, 5:
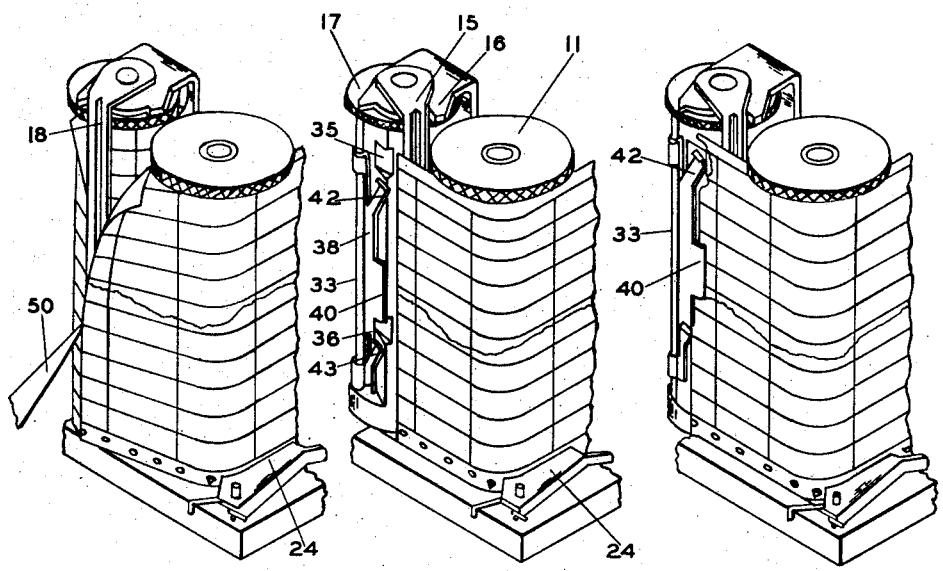
Figure 6:
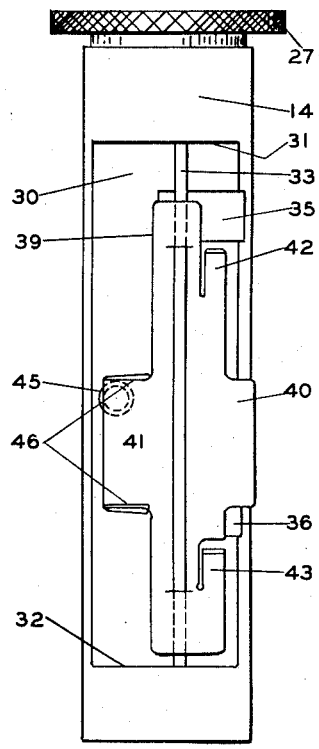
Figure 6 is a front elevation of a receiving roll embodying elements of the invention.

In order to enter the end of the paper strip in the space between the clip 40 and the cylindrical surface of the roll 14, the driving drum 11 may be manually rotated sufficiently far to bring the extremity of the paper into abutment with the edges of the tongue members 42 and 43. Should it be desired not to disturb a time setting already established between the chart graduations and the pen 26, the receiving roll 14 may be turned backward sufficiently to engage the paper strip in a similar manner. By manually grasping the ears 46, the member 38 is now moved to the opposite—the upper—extremity of its travel, as indicated in Figures 5, 9 and 11, whereupon the tongues 42—43, cooperating in a camming action with the grooves 35—36 respectively, enter said grooves, allowing the member 38, under the influence of the spring 45, to be rotated through a small angle about the axis of the rod 33, bringing the clip 40 toward the surface of the roll 14 and clampingly securing the end of the paper strip therebetween. If necessary, the feed-roll 11 and the receiving roll 14 may be manually rotated until the time graduations on the chart have a correct setting with respect to the recording pen 25, the end of the chart being more or less wrapped about the receiving roll 14, and conditions being as indicated in Figure 1 of the drawings. The lateral projection or clip 40 being of inconsiderable thickness, and the ears 46 lying wholly within the periphery of the receiving roll, there will be no appreciable interference with smooth distribution of paper on the roll as superimposed layers accumulate with normal progress of the chart through the instrument.

Figure 2:
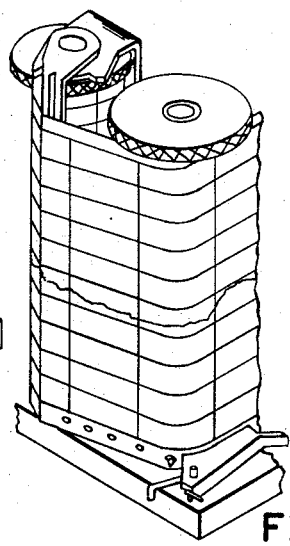
Figures 2, 3, 4 and 5 are similar representations of a portion of said mechanism with component parts in several of their possible operating positions.

Consideration may now be given to the manner of removing an accumulated length of chart from the instrument. Starting with normal operating conditions, as indicated in Figure 1, the guide 15 is manually rotated until, instead of engaging the stop 16 it engages the stop 17, with the bar portion 19 in contact with the rear surface of the paper, and forcing the same a slight distance forward from its normal operating plane, as indicated in Figure 2. The necessary slack to allow of this elongation may be obtained either by rotating the driving drum forward a slight distance, or, if it be desired not to disturb the time setting of the chart, by rotating the receiving roll 14 backward against its friction drive. With the bar portion of the guide 15 providing a flat platen beneath the chart paper, the latter may now be severed by passing the point of a knife 50 or equivalent sharp instrument along the surface of the paper in line with the groove 18, as indicated in Figure 3, and thus providing a square-cut end suitable for re-insertion in the receiving roll 14 after the accumulated length of chart has been removed.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a recording apparatus, feed means for feeding an elongated record sheet along a predetermined path past recording means, record sheet receiving means defining a generally cylindrical surface for receiving said record sheet and accumulating the same therearound, support means rotatably supporting said receiving means adjacent one end of said path, said receiving means having an elongated recess formed therein radially inward of said generally cylindrical surface and extending transversely of said path, record sheet engaging means and means supporting the same with said record sheet engaging means extending and movable transversely of said path substantially parallel to the axis of said cylindrical surface and within said recess and having a clip portion for removably securing said record sheet to said receiving means, said record sheet engaging means further including means for releasing said clip portion from engagement with said record sheet when said engaging means is moved transversely from one position to another, and means for providing an edge to said record sheet suitable for engagement by said engaging means while leaving the relationship between said recording means and th portion of said record sheet adjacent thereto undisturbed and comprising a member, means supporting and for moving said member into and out of said path between a portion of said record sheet and said receiving means, said member having an elongated groove formed therein extending transversely of said path for receiving and guiding an edge of a sharp instrument pressed through said record sheet and drawn transversely thereacross for severing the same.

2. In a recording apparatus, feed means for feeding an elongated record sheet along a predetermined path past recording means, a record sheet receiving roll for accumulating said record sheet, support means rotatably supporting said roll adjacent said path, said roll having an elongated recess formed therein extending transversely of said path, record sheet engaging means and means supporting the same within said recess with said record sheet engaging means extending and movable transversely of said path and parallel to the axis of rotation of said roll, said record sheet engaging means including a clip portion for removably securing said record sheet to said roll and means for releasing said clip portion from engagement with said record sheet when said engaging means is moved transversely from one position to another, and means on said support means for providing an edge of said record sheet suitable for engagement by said engaging means while leaving the relationship between said recording means and the portion of said record sheet adjacent thereto undisturbed and comprising an elongated guide member movable into and out of said path and having an elongated groove formed therein extending transversely of said path for receiving and guiding an edge of a sharp instrument pressed through said record sheet and drawn transversely thereacross for severing the same.

3. In a recording apparatus, feed means for feeding an elongated record sheet along a predetermined path past recording means, a record sheet receiving roll having a generally cylindrical surface for receiving said record sheet thereabout and accumulating the same, support means rotatably supporting said roll adjacent said path, said surface having an elongated recess formed therein extending transversely of said path, record sheet clamping means supported radially inwardly of said surface and longitudinally movable in said recess substantially parallel to the axis of said roll and angularly displaceable about an axis extending longitudinally within said recess, said record sheet engaging means including a clip portion for removably securing said record sheet to said roll, resilient means urging said clamping means in one direction about said axis and said clip portion against said roll, and camming means for releasing said clip portion from engagement with said record sheet and actuated when said record sheet clamping means is moved longitudinally in said recess from one position to another.

4. In a recording apparatus, feed means for feeding an elongated record sheet along a predetermined path past recording means, record sheet receiving means including a generally cylindrical drum for receiving said record sheet thereabout, support means rotatably supporting said drum adjacent said path, said drum having an elongated recess formed in the periphery thereof and extending transversely of said path, an elongated rod connected to said drum and extending axially in said recess, a clamping member extending in said recess and rotatably mounted on said rod, said clamping member being axially displaceable in said recess along said rod from one position to another position, said clamping member having a clip portion disposed for clamping engagement with the periphery of said drum for securing the extremity of said record sheet to said drum, resilient means urging said clamping member about said rod to bring said clip portion against said drum when said clamping member is in its said one position, and camming means actuated by axial displacement of said clamping member from said one position to said another position for effecting limited angular displacement of said clamping member about said rod and carrying said clip portion away from the periphery of said drum.

5. In a recording apparatus, feed means for feeding an elongated record sheet along a predetermined path past recording means, record sheet receiving means including a generally cylindrical drum for receiving said record sheet thereabout, support means rotatably supporting said drum transversely of and adjacent to said path, said drum having an elongated recess formed in the periphery thereof and extending transversely of said path and at least one groove opening into said recess, an elongated rod connected to said drum and extending axially in said recess, a clamping member extending in said recess and rotatably mounted on said rod, said clamping member being axially displaceable in said recess along said rod from one position to another position, said clamping member having a clip portion disposed for clamping engagement with the periphery of said drum for securing the extremity of said record sheet to said drum, resilient means urging said clamping member about said rod to bring said clip portion against said drum when said clamping member is in its said one position, and at least one tongue member connected to said clamping member and having a portion thereof positioned for registration with and insertion into said groove when said clamping member is in its said one position, said groove having a dimension in the direction of axial displacement of said clamping member such that said tongue member portion is carried out of said groove when said clamping member is axially displaced from said one position to said other position thereby rotating said clamping member about said rod carrying said clip portion away from the periphery of said drum.

6. In a recording apparatus, feed means for feeding an elongated record sheet along a predetermined path past recording means, record sheet receiving means including a generally cylindrical drum for receiving said record sheet thereabout, support means rotatably supporting said drum adjacent said path, said drum having an elongated recess formed in the periphery thereof and extending transversely of said path, an elongated rod connected to said drum and extending axially in said recess, a clamping member extending in said recess and rotatably mounted on said rod, said clamping member being axially displaceable in said recess along said rod from one position to another position, said clamping member having a clip portion extending out of said recess for clamping engagement with the periphery of said drum for securing the extremity of said record sheet to said drum, resilient means urging said clamping member about said rod to bring said clip portion against said drum when said clamping member is in its said one position, a pair of axially spaced tongue members each connected to said clamping member and inclined radially inward relative to and engaging said drum within said recess, said drum having a pair of grooves formed therein and opening into said recess with said grooves each positioned for receiving a portion of one of said tongue members when said clamping member is in its said one position, and said grooves each having a dimension in the direction of axial displacement of said clamping member such that said tongue members are removed from said grooves when said clamping member is axially displaced from said one position to said another positon thereby rotating said clamping member about said rod and maintaining said clip portion away from the periphery of said drum.

7. In recording apparatus of the class wherein a record sheet is continuously advanced past a recording member to receive a record thereon, a receiving roll for accumulating said record sheet, comprising a drum having a cylindrical surface and adapted to be yieldingly rotated at a peripheral speed substantially that of said record sheet, a member carried by said drum and adapted for limited translation in a sense parallel to the axis of said drum and for limited rotation about an axis lying within the periphery of said drum and parallel to said first named axis, and having a clip portion overlying the cylindrical surface of said drum, means for manually effecting translation of said member parallel to the drum axis, and camming means actuated by the translation of said member to effect angular dislacement of the same with respect to said drum, whereby to juxtapose said clip portion to said cylindrical surface in clamping relationship to secure the extremity of said record sheet to said receiving roll.

8. In a recording apparatus, feed means for feeding an elongated record sheet along a predetermined path past recording means, record sheet receiving means for engaging a free end of and accumulating said record sheet after it has passed said recording means, and means for engaging said record sheet when transversely severing the same adjacent said receiving means with said recording means in undisturbed recording relation to the portion of said record sheet adjacent thereto, said means including an elongated member having a groove formed therein extending transversely of said path and means supporting and for angularly displacing said elongated member about said receiving means into position along said path to engage said record sheet and withdraw a portion thereof from said receiving means and with said groove opening toward said record sheet, whereby to receive in said groove a sharp instrument pressed through said record sheet for severing the same, said withdrawn portion of said record sheet when severed being readily re-engageable with said record sheet receiving means while leaving said recording means and said record sheet in mutually undisturbed relation.

9. In a recording apparatus, feed means for feeding an elongated record sheet along a predetermined path past recording means, record sheet receiving means for engaging a free end of and accumulating said record sheet after it has passed said recording means, guide means for engaging said record sheet when transversely severing the same intermediate said recording means and said receiving means with said recording means in continuous operating relation with the portion of the record sheet adjacent thereto, said guide means including an elongated bar member extending transversely of said path and having a longitudinal groove formed therein opening toward said path, and means supporting and for moving said bar member into and out of said path intermediate said recording means and said receiving means to engage said record sheet and withdraw a portion thereof from said receiving means, whereby in one position said bar member presents a limited supporting surface for said record sheet and guides the point of a sharp instrument pressed through said record sheet and drawn transversely thereacross for severing the same, said withdrawn portion of said record sheet when severed being readily re-engageable with said record sheet receiving means while leaving said recording means and said record sheet in mutually undisturbed relation.

10. In a recording instrument of the class wherein an elongated record sheet having a front and a rear surface is continuously advanced along a path extending past a recording means to receive a record on its front surface, a roll for engaging and accumulating said record sheet after it has received said record, guide means for supporting said record sheet when severing said accumulated record sheet with said recording means in continuous operating relation with the portion of the record sheet adjacent thereto, said guide means comprising a bar member extending transversely of said record sheet to the rearward thereof and means supporting and for rotating said bar member about said roll into and out of the path of said record sheet as it approaches said roll to engage said record sheet and withdraw a portion thereof from said roll, whereby in one position to present a limited supporting surface at the rear of the record sheet and in the other position to be substantially clear of the record sheet, said bar member having a longitudinal groove extending transversely of said record sheet whereby when in the first of said positions to guide the point of a sharp instrument pressed through said record sheet and drawn transversely thereacross for severing the same, said withdrawn portion of said record sheet when severed being readily re-engageable with said roll while leaving said recording means and said record sheet in mutually undisturbed relation.

11. In recording apparatus of the class wherein an elongated record sheet having a front and a rear surface is continuously advanced past a recording means to receive a record on its front surface and is caused to lie substantially in a plane after receiving said record, record sheet receiving means for accumulating said record sheet, means for yieldingly driving said receiving means whereby a portion of said record sheet may be drawn therefrom at will, said record sheet receiving means being adapted for engaging a free end of said record sheet, means to facilitate severing of the record-bearing portion of said sheet with said recording means in continuous operating relation with the portion of the record sheet adjacent thereto, said means comprising a bar member extending transversely of said sheet to the rearward thereof and means supporting and for moving said bar member about said receiving means at will alternatively into, or behind, said plane, whereby in one position to draw a portion of the accumulated record sheet from said receiving means and present a limited supporting surface at the rear of said sheet and in the other position to be substantially clear of the sheet, said bar member having a longitudinal groove extending transversely of said sheet, whereby when in the first of said positions to guide the point of a sharp instrument pressed through said sheet and drawn transversely thereacross for severing the same, said withdrawn portion of said record sheet when severed being readily re-engageable with said record sheet receiving means while leaving said recording means and said record sheet in mutually undisturbed relation.

References Cited in the file of this patent
UNITED STATES PATENTS

| | | |
|---|---|---|
| 683,524 | Tinkham | Oct. 1, 1901 |
| 1,492,559 | Ewing | May 6, 1924 |
| 1,906,638 | Schwartz | May 2, 1933 |
| 2,663,609 | Jones | Dec. 20, 1953 |
| 2,671,710 | Bowditch | Mar. 9, 1954 |
| 2,699,372 | Mosler | Jan. 1, 1955 |
| 2,701,177 | Rennes | Feb. 1, 1955 |
| 2,745,711 | Schweitzer | May 15, 1956 |

UNITED STATES PATENT OFFICE

CERTIFICATE OF CORRECTION

Patent No. 2,927,835　　　　　　　　　　　　　　　March 8, 1960

William C. Virbila

It is hereby certified that error appears in the printed specification of the above numbered patent requiring correction and that the said Letters Patent should read as corrected below.

Column 5, line 69, for "an edge of" read -- an edge to --; column 10, line 7, for the date "Dec. 20, 1953" read -- Dec. 22, 1953 --.

Signed and sealed this 31st day of January 1961.

(SEAL)
Attest:
KARL H. AXLINE
Attesting Officer

ROBERT C. WATSON
Commissioner of Patents